Patented May 31, 1949

2,471,446

UNITED STATES PATENT OFFICE 2,471,446

MEANS AND METHOD OF TREATING BARIUM SULFATE WITH CARBONATES

James E. Norman, Birmingham, Ala.

No Drawing. Application June 25, 1946, Serial No. 679,275

5 Claims. (Cl. 252—8.5)

This invention relates to a product and process for production of barium sulfate concentrate for use as an oil well drilling fluid, and more specifically to a method whereby the quality of the barium sulfate concentrate may be improved so as to render it more suitable for this purpose.

Mud laden fluids are usually used in the drilling of wells and more particularly in the drilling of oil and gas wells. These fluids are circulating into and out of the well bore.

Great difficulty is encountered in obtaining a mud-fluid which has the correct characteristics to be used as a drilling fluid. The method of preparation of the constituents greatly affects the physical characteristics of the mud; ions which are encountered by the drilling fluid in the course of the drilling also affect the physical characteristics of the drilling fluid.

For the most part constituents of the mud which have been prepared so as to counteract any detrimental characteristics in the mud which affect the physical characteristics of the drilling mud, or a mud which has been prepared to minimize, and even eliminate the effects of these detrimental characteristics prior to the use of the mud in the well bore, would vitiate the largest part of the difficulties now encountered during the course of drilling.

It is an object of the invention to convert acid forming sulfides in a drilling mud or admix therefor into relatively insoluble sulfites or sulfates so as to avoid the detrimental effect of such sulfides in the use of the drilling mud.

It is also an object of the invention to set forth a method of preparing an admix for a drilling mud fluid.

It is another object of the invention to provide a process of treating barium sulfate concentrates obtained from a flotation procedure so as to render impurities present in the barium sulfate concentrate, innocuous.

A further object is to eliminate excess acidity inherent in a barium sulfate concentrate obtained by a flotation procedure.

Still another object is to eliminate excess acidity in a barium sulfate concentrate so as to leave no deleterious reaction products in the barium sulfate concentrate.

In the purification of barite ore for use in a drilling mud, the ore is subjected to flotation after the particles are selectively filmed by a collector or filming agent. This filming agent renders the barium sulfate water repellant and capable of adhering to gas bubbles. The gangue, or waste mineral settles to the bottom of the container and as a gas is pumped through the liquid, the barium sulfate concentrate will go to the top of the container and is collected.

The barium sulfate produced in this manner retains the filming agent on its surface until the end of the flotation procedure. Therefore, in order to render the concentrate suitable for its ultimate use, it is necessary to remove the water repellant filming agent because it renders the material non-wettable when in use in the drilling mud.

There are, of course, different procedures for removing, neutralizing or actually counteracting the filming agents on the particles. One practical method which is in commercial use is to roast or calcine the flotation product. Difficulty is encountered in obtaining a uniform product because over-heating or burning results in decomposition of some of the barium sulfate into oxides or other soluble barium compounds. This is particularly true where the flotation product carries certain impurities such as metallic sulfides which are usually present as impurities in the barium sulfate concentrate. These sulfides are carried over in the froth flotation. Even a small quantity of sulfide is almost always difficult, if not impossible to separate from the barium sulfate by flotation.

This metallic sulfide impurity, therefore, remains in the barium sulfate concentrate, and it has been determined that these metallic sulfide impurities undergo partial decomposition in the aforementioned heating operation. Because of this decomposition, sulfurous or sulfuric, or possibly small amounts of both acids are found in the barium sulfate concentrate. The portion of these aforesaid acids which remain in the barium sulfate product imparts to it an acid reaction which causes an undesirable increase in the viscosity of the drilling mud in which the barium sulfate is subsequently used.

The acidity of the barium sulfate concentrates may be eliminated by treatment of the concentrate with commercial alkaline reagents such as lime or soda ash. However, neutralization of the aforesaid acidity by these alkaline reagents produces relatively soluble salts of sulfurous or sulfuric acid, which soluble salts are in themselves detrimental in subsequent use of the barium sulfate concentrate.

By treating the barium sulfate concentrates, before or after the aforementioned heating operation with small quantities of the relatively insoluble carbonates of barium or strontium, a barium sulfate product results having more constant physical qualities during use in the drilling fluid. The barium or strontium carbonate added results in the formation of relatively insoluble sulfites or sulfates of barium or strontium. This neutralization of the sulfurous or sulfuric acids may take place either before or after drying of the barium sulfate concentrate.

Various amounts of either barium or strontium carbonates or both may be added to the barium sulfate concentrate depending upon the amount of acid to be neutralized; however, approximately five pounds per ton of concentrate has been found to be quite satisfactory. The carbonate may be added prior to the removal of the filming agent, or it may be added subsequent to the removal of the filming agent.

In order to illustrate one application of the invention, the following example is set forth:

*Example*

A sample of previously heated barium sulfate concentrate was added to a 3.5 per cent suspension of Wyoming bentonite in such an amount that the resulting suspension possessed a weight of sixteen pounds per gallon. The mixture was agitated for a period of ten minutes. A sample of the resultant mixture was tested for acidity and found to possess a pH of 6.0. It was noted that the mud was of a semi-plastic nature, its viscosity being so great that it would not pour easily from one container to another.

The procedure was duplicated on another sample of the same material, except that approximately five pounds of barium carbonate per ton of concentrate was added to the barium sulfate concentrate. A sample of the prepared mixture was tested for acidity and found to possess a pH of 7.5. The mud in this case was very fluid, and its viscosity was sufficiently low to enable it to pour freely from one container to another. This fluidity is desirable in such a mud when it is being used for drilling of wells, since a mud which is of a high viscosity will cause sticking of the drill bit.

From this example, it is observed that the quality of drilling muds containing barium sulfate which concentrate has been treated in accordance with the invention, enhances the desirable properties of the drilling fluid.

Broadly the invention contemplates a process and a product wherein a barium sulfate containing either or both sulfurous and sulfuric acid as impurities has admixed therewith a small percentage of a relatively insoluble carbonate which will react to form either or both insoluble sulfites or sulfates.

The invention claimed is:

1. In the method of producing barium sulphate for a drilling mud admix from a concentrate containing metallic sulfide as an impurity, the steps of selectively filming the concentrate by a filming agent, subjecting the filmed concentrate to a froth flotation to obtain a flotation product, heating the flotation product to remove the filming agent, and adding barium carbonate to react with the sulfurous and sulfuric acid impurities formed by heating so as to render such impurities innocuous in the drilling mud.

2. In the process of producing barium sulfate for use in a drilling mud where such barium sulfate contains a small percentage of sulfurous acid impurities which affect the desirable characteristics of the drilling mud the step of, adding a small percentage of relatively insoluble barium carbonate to convert the impurities to insoluble sulphites which do not affect the desirable characteristics of the mud.

3. In the process of producing barium sulfate for use in a drilling mud where such barium sulfate contains a small percentage of sulfuric acid impurities which affect the desirable characteristics of the drilling mud the step of, adding a small percentage of relatively insoluble barium carbonate to convert the impurities to insoluble sulphates which do not affect the desirable characteristics of the mud.

4. In the process of producing barium sulfate for use in a drilling mud where such barium sulfate contains a small percentage of sulfurous and sulfuric acid impurities which affect the desirable characteristics of the drilling mud the step of, adding a small percentage of relatively insoluble barium carbonate to convert the impurities to insoluble sulphurous barium compounds and which do not affect the desirable characteristics of the mud.

5. An admix for drilling muds comprising barium sulfate which contains at least one member selected from the group consisting of sulphurous and sulphuric acid impurities and a small percentage of at least one alkaline earth carbonate selected from the group consisting of barium carbonate and strontium carbonate which percentage is sufficient to react in water with such acid impurities to form the corresponding insoluble alkaline earth compound.

JAMES E. NORMAN.

REFERENCES CITED

The following references are of record in the file of this patent:

UNITED STATES PATENTS

| Number | Name | Date |
|---|---|---|
| 2,280,035 | Harrison | Apr. 14, 1942 |
| 2,393,165 | Hoeppel | Jan. 15, 1946 |

OTHER REFERENCES

Norman et al., Flotation of Barite from Magnet Cove, Arkansas, Article in Mining Technology, May 1941, Technical Publication No. 1326 of American Institute of Mining and Metallurgical Engineers.